(12) United States Patent
Raghavendran et al.

(10) Patent No.: US 8,130,675 B2
(45) Date of Patent: Mar. 6, 2012

(54) CARRIER ETHERNET SERVICE DISCOVERY, CORRELATION METHODOLOGY AND APPARATUS

(75) Inventors: Vijayakumar Raghavendran, Cary, NC (US); Ajay Simha, Cary, NC (US); Peter R. Sprygada, Cary, NC (US); Manojkumar S. Joshi, Morrisville, NC (US); Shankar R. Varanasy, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 278 days.

(21) Appl. No.: 12/509,140

(22) Filed: Jul. 24, 2009

(65) Prior Publication Data

US 2011/0019584 A1 Jan. 27, 2011

(51) Int. Cl.
*H04L 12/28* (2006.01)
(52) U.S. Cl. .......... 370/254; 370/255; 370/389
(58) Field of Classification Search .......... None
See application file for complete search history.

(56) References Cited

U.S. PATENT DOCUMENTS

| | | | | |
|---|---|---|---|---|
| 5,872,911 A * | 2/1999 | Berg | | 714/43 |
| 6,633,312 B1 * | 10/2003 | Rochford et al. | | 715/736 |
| 7,292,581 B2 * | 11/2007 | Finn | | 370/395.53 |
| 7,463,639 B1 * | 12/2008 | Rekhter | | 370/409 |
| 7,523,128 B1 * | 4/2009 | Miller et al. | | 1/1 |
| 7,730,494 B1 * | 6/2010 | Rosenbluth et al. | | 719/318 |
| 2005/0047350 A1 * | 3/2005 | Kantor et al. | | 370/254 |
| 2008/0317030 A1 * | 12/2008 | Rhee et al. | | 370/392 |
| 2010/0008365 A1 * | 1/2010 | Porat | | 370/392 |
| 2010/0287403 A1 * | 11/2010 | Jenkins et al. | | 714/2 |

* cited by examiner

*Primary Examiner* — Robert Wilson
(74) *Attorney, Agent, or Firm* — Schwegman, Lundberg & Woessner, P.A.

(57) ABSTRACT

In an example embodiment, a method of service discovery and correlation is provided. In example embodiments, a network management system discovers, categorizes, and stores data on network elements (e.g., devices, provisioning, relationships, protocols, and topology) in a carrier network. Using a unique set of rules, relational groupings based on the discovered network elements may be created. The relational groupings, in turn, facilitate creation of a centralized carrier service view. By correlating the results of the discovery process with the centralized carrier service view, fault management, availability of service, and other observations of services can be deduced.

20 Claims, 8 Drawing Sheets

CARRIER ETHERNET SERVICE DISCOVERY, CORRELATION METHODOLOGY AND APPARATUS

FIELD

The present disclosure relates generally to computer networks. In an example embodiment, the disclosure relates to Carrier Ethernet service discovery, correlation methodology, and a corresponding apparatus.

BACKGROUND

Carrier Ethernet is a service offering over broadband wide area Ethernet. The services may be offered to residences, businesses, and wholesale. Often, the services are offered by carriers or service providers such as Verizon, AT&T, and Embark. Services may include broadband Internet service, digital voice, and broadcast video and video-on-demand.

The carriers or service providers use a set of servers and other devices in order to detect faults within their network and to measure availability, capacity, and performance of their network in order to provide services in a satisfactory manner (e.g., minimal down time and outages) to their end customers (e.g., residences, business, and wholesale).

BRIEF DESCRIPTION OF DRAWINGS

The present disclosure is illustrated by way of example and not limitation in the figures of the accompanying drawings, in which like references indicate similar elements.

DETAILED DESCRIPTION

The following detailed description includes references to the accompanying drawings, which form a part of the detailed description. The drawings show, by way of illustration, example embodiments in which the claimed subject matter may be practiced.

Overview

Embodiments provide systems and methods for Carrier Ethernet service discovery and correlation. In example embodiments, a network management system discovers, categorizes, and stores data on network elements (e.g., devices, provisioning, relationships, protocols, and topology) within a carrier network. Using a unique set of rules, relational groupings based on the discovered network elements may be created.

Example Embodiments

Figure 1:
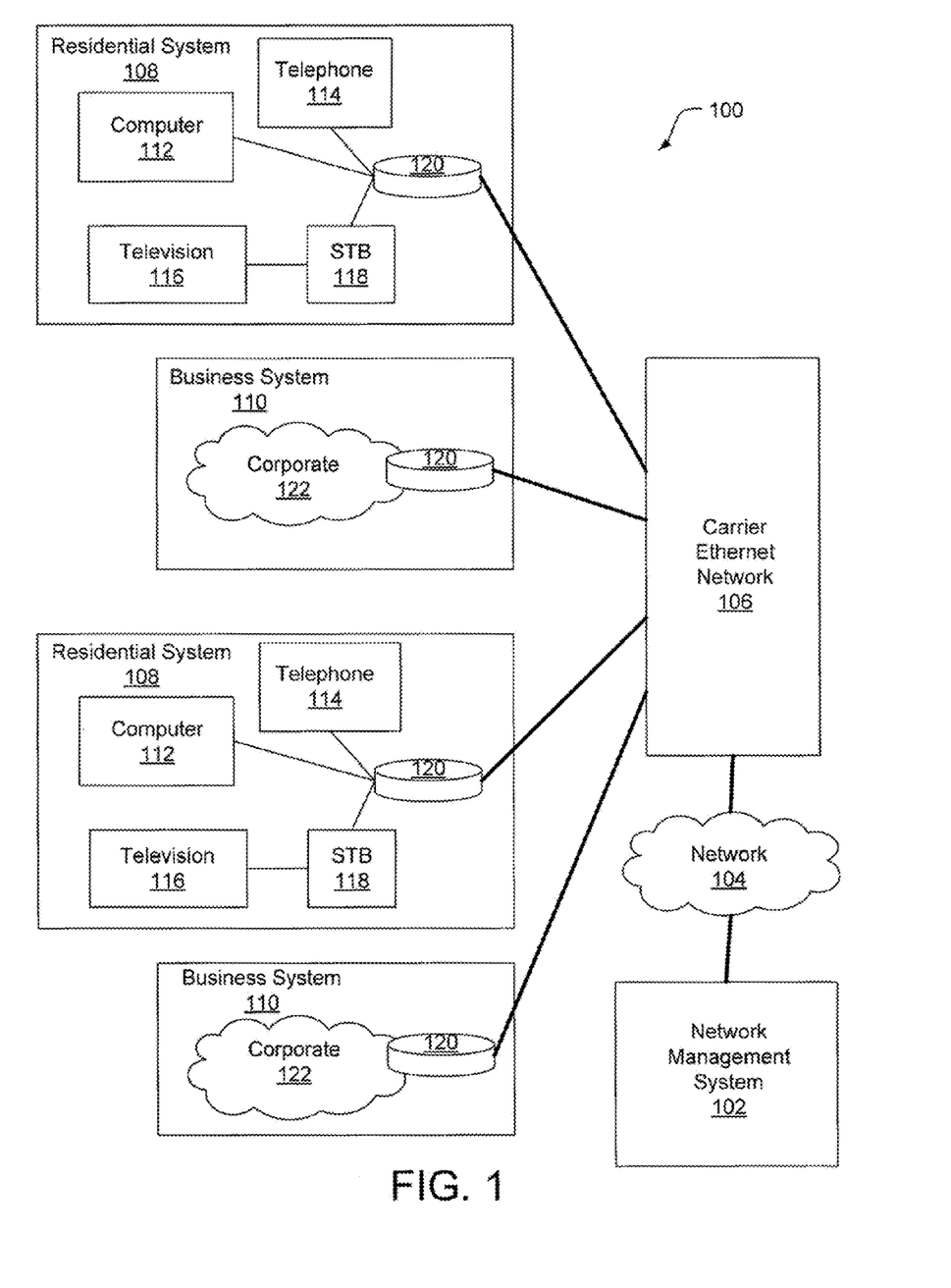
FIG. 1 depicts a diagram of an example of an IP carrier Ethernet centralized architecture.

FIG. 1 depicts a diagram of an example IP carrier Ethernet centralized architecture 100. The architecture 100 is a scalable architecture for delivering multiple services to end-users (e.g., residential, business, and wholesale) over a common infrastructure. The architecture 100 includes a network management system 102 coupled via a communication network 104 to a Carrier Ethernet network 106. The communication network 104 may comprise any local or wide area network (e.g. Service Provider Core, the Internet).

The network management system 102 is a service exchange which manages the Carrier Ethernet network 106. The network management system 102 may include modules, engines, or systems which perform functions directed to providing a portal (e.g., for registration), monitoring, billing, identity verification, address management, and policy definitions. In an example embodiment, the network management system 102 may monitor the Carrier Ethernet network 106 via the communication network 104. The network management system 102 and/or some of the network management system components may be located within the Carrier Ethernet network 106 or be located remotely (e.g. Network Probes).

The carrier Ethernet network 106 is a network of servers, databases embodied on storage devices, and devices which provide services to the end-users (e.g., residential, business, and wholesale) over a broadband wide area Ethernet. The services are offered by carriers or service providers. The carrier Ethernet network 106 will be discussed in more detail in connection with FIG. 2.

The end-users include any number of residential systems 108 and business systems 110. Each residential system 108 provides services such as, for example, Internet service (e.g., residential high speed Internet), digital voice (e.g., VoIP), broadcast video, and video-on-demand service (e.g., pay per view). As such, one or more computers 112, telephones 114, and televisions 116 coupled to set top boxes (STB) 118 may be coupled to a hub or router device 120 within the residential system 108. Business systems 110 may provide business high speed Internet and private virtual private network (VPN) services within a corporate network 122 (e.g., LAN). Additionally, wholesalers (not shown) may also be end users of the carrier Ethernet network 106. The wholesale services include Ethernet aggregation services, wholesale Internet access, or wholesale triple play services (e.g., offering three services packaged together). The provided lists of services are merely examples, and any type of service which may be provided via a network is within the scope of example embodiments.

It should be appreciated that in alternative embodiments, the architecture 100 is scalable and may include fewer or more systems and networks coupled together. For example, any number of residential systems 108, business system 110, or wholesaler systems may be coupled to the carrier Ethernet network 106. These alternative embodiments are contemplated to be within the scope of example embodiments.

Figure 2:
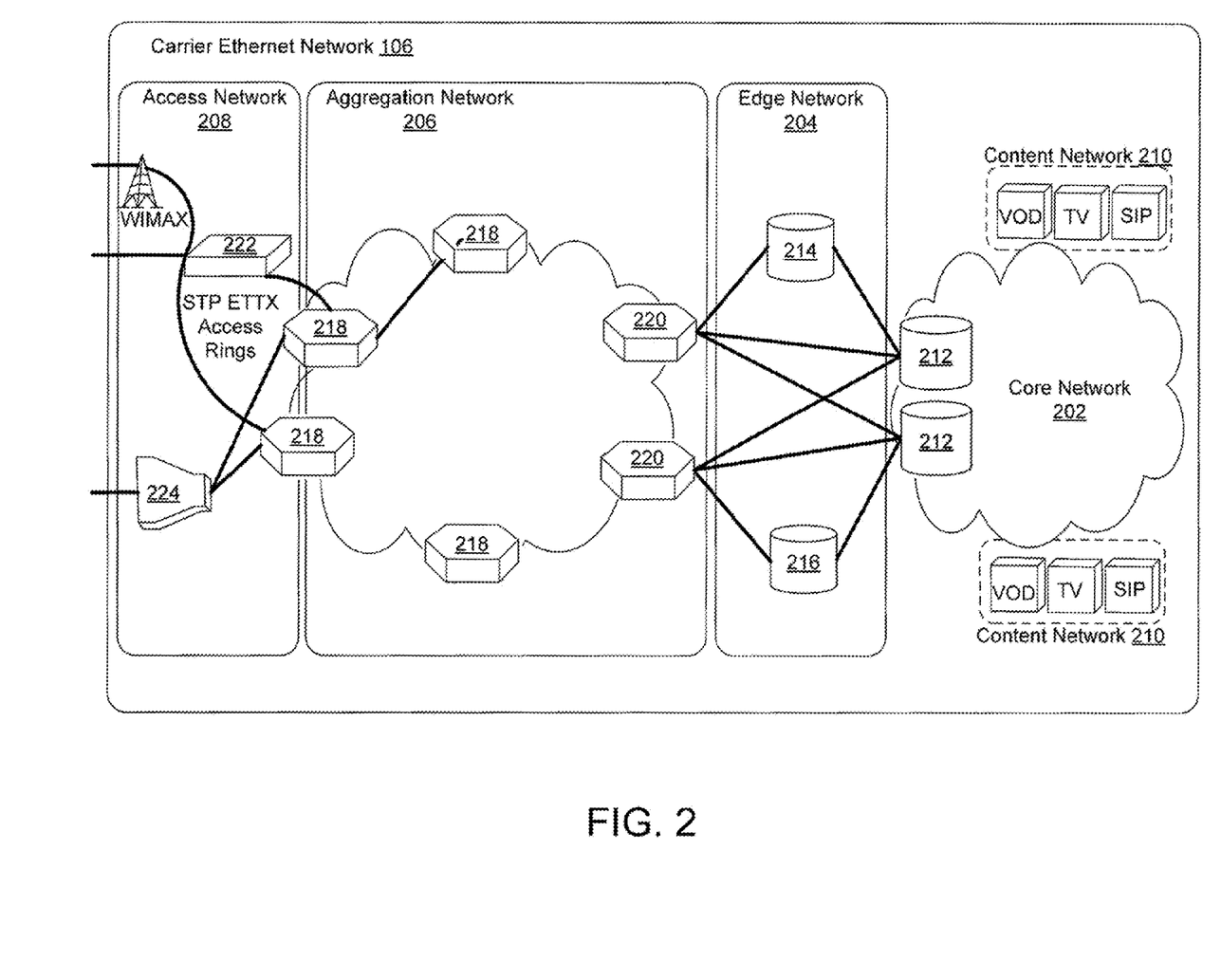
FIG. 2 depicts a diagram of an example carrier Ethernet network.

FIG. 2 depicts a diagram of the example Carrier Ethernet network 106. The Carrier Ethernet network 106 comprises a set of devices (e.g., routers, switches, network connectors, servers, storage devices) that are couple together and are provisioned to provide services to the end-users. In an example embodiment, the Carrier Ethernet network 106 includes a core network 202, an edge network 204, an aggregation network 206, and an access network 208 which function together to provide the services. Typically, a carrier or service provider owns the core network 202 where multiple market regions (e.g., North East, South East, North West, etc.) are aggregated together, owns the aggregation network 206 where cities (e.g., New York, San Francisco, etc.) are connected to the Carrier Ethernet network 106, and owns the access network 208 where parts of a city (e.g., Long Island, Manhattan) will connect to the Carrier Ethernet network 106.

The core network 202 comprises one or more content networks 210 which provide content and services to the end-users. The content and services may include, for example, video-on-demand (VOD), broadcast video (TV), and session initiation protocol (SIP) services (e.g., digital voice). The content may be provided via core interface devices 212 to the edge network 204. The core interface devices 212 may comprise routers, switches, or hubs.

The edge network 204 comprises one or more devices which provide subscriber and service-specific edge functions. These functions include, for example, enforcement of service level agreements (SLAs) and mapping of core network transport instances. The devices may include one or more residential broadband network gateways (BNGs) 214 and one or more business multi-service edge (MSE) devices 216. The BNGs 214 and MSE devices 216 provide the link between the core network 202 and the aggregation network 206.

The aggregation network 206 functions to provide efficient and resilient transport functions between the edge network 204 and the access network 208, and provides intelligent multiplexing functions to aggregate the access network(s) 208 into transport services of the edge network 204. The aggregation network 206 includes a plurality of aggregation nodes 218 and distribution nodes 220 which may be deployed in various physical topologies (e.g., rings, hubs, spokes). The aggregation node 218 provides an intermediate aggregation and multiplexing layer between the edge network 204 and the access network 208. In example embodiments, the aggregation node 218 functions to provide advanced Ethernet service functions for interfacing with nodes of the access network 208 and, in some cases, with business customer premises equipment (CPE).

The distribution node 220 presents a demarcation point for the aggregation network 206 which provides an Ethernet handoff to the BNGs 214 and MSE devices 216 of the edge network 204. The distribution node 220 also provides aggregation for the aggregation network Ethernet over multiprotocol label switching (MPLS) and hierarchical virtual private LAN (H-VPLS) transport services. The distribution node 220 may also act as an intermediate IP/Multiprotocol Label Switching (IP/MPLS) forwarding node for IP television (IPTV) services.

The example access network 208 supports scalable broadband access for residential and business services from the aggregation network 206 to the residential systems 108 and business systems 110. The access network 208 may leverage DSL Forum, WiMAX Forum, Metro Ethernet Forum (MEF), and IEEE, depending upon type of last-mile technology deployed. The access network 208 comprises nodes or devices which support the delivery of the services. The nodes or devices include, for example, Ethernet access nodes 222, which may provide WiMAX, DSL access nodes 224, cable access nodes, passive optical network access nodes, and multi-service provisioning platform access nodes.

In example embodiments, the network management system 102 discovers, categorizes, and stores data on all disparate devices, provisioning, relationships, protocols, and topology within the Carrier Ethernet network 106 (collectively referred to as "network elements") to create an end-to-end centralized Ethernet view of the Carrier Ethernet network 106. The centralized Ethernet view is a logical view of the Carrier Ethernet network 106 based on types of service of interest. Using a unique set of rules, relational groupings based on the discovered network elements may be created, which facilitate the creation of the centralized Ethernet view. By correlating the results of the discovery process with the centralized Ethernet view, fault management, availability of service, and other observations of services can be deduced.

Figure 3:
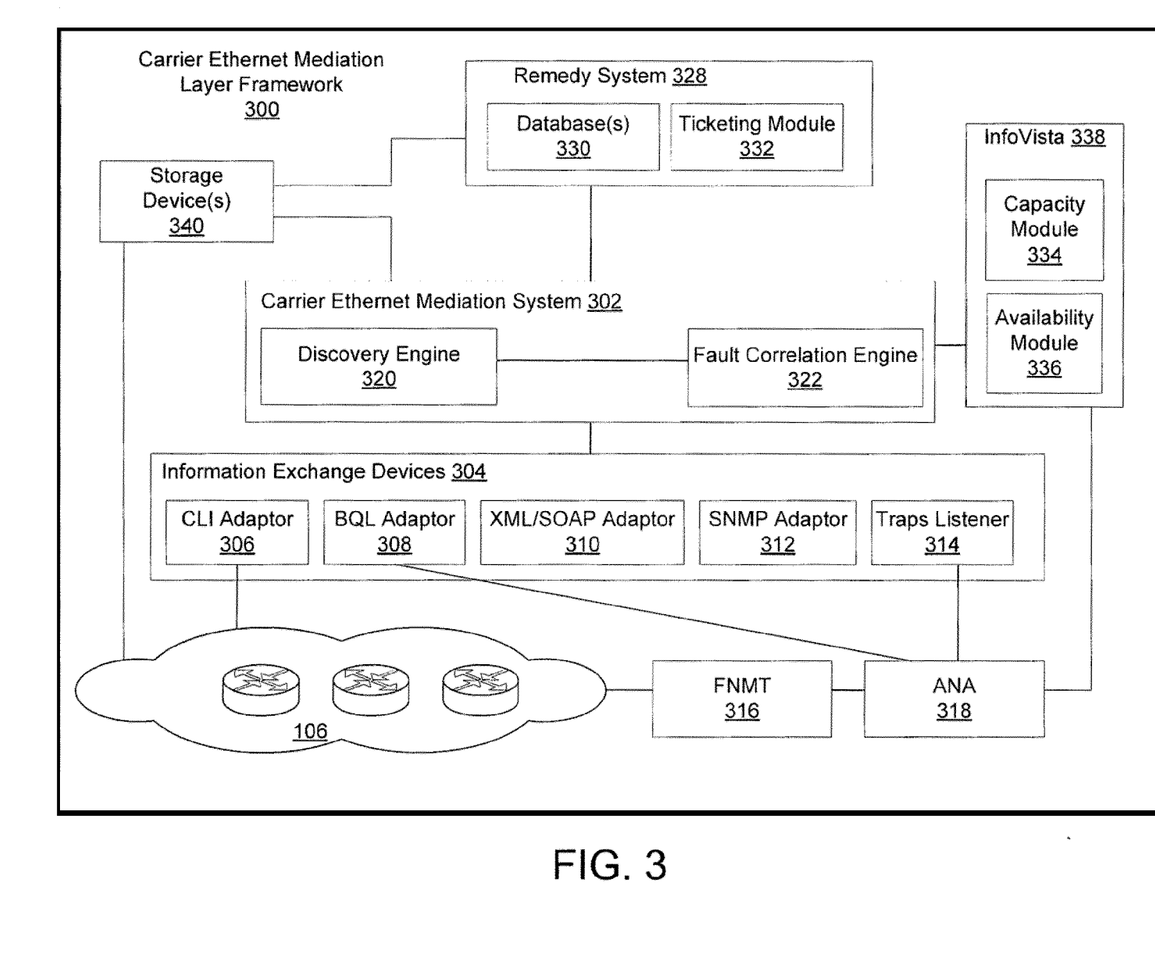
FIG. 3 depicts a block diagram of a carrier Ethernet mediation layer framework in accordance with an embodiment.

Referring now to FIG. 3, a Carrier Ethernet mediation layer framework 300 including a Carrier Ethernet mediation system 302 is depicted. The Carrier Ethernet mediation system 302 provides communication between other subsystems within the framework to make logical connections between an application layer (e.g., voice, video, data layer) and the network layer, such that if an event (e.g., fault event) occurs within the Carrier Ethernet network 106, the proper information (e.g., network impact to application impact) may be provided to the proper system and network operators. Some or all of the components of the Carrier Ethernet mediation layer framework 300 are embodied within the network management system 102.

The Carrier Ethernet mediation layer framework 300 allows management of detected faults in a meaningful manner to determine what services are affected, which users/customers are affected, and to what extent the users/customers are affected. Similarly, the Carrier Ethernet network 106 can be measured in a meaningful manner to determine capacity of the Carrier Ethernet network 106 or determine how many more subscribers may be added to the Carrier Ethernet network 106 without degrading service for existing subscribers.

In example embodiments, devices in the Carrier Ethernet network 106 (e.g., the disparate devices of FIG. 2) are monitored. A plurality of information exchange devices 304 exchange data between the devices in the Carrier Ethernet network 106 and the Carrier Ethernet mediation system 302. These information exchange devices 304 communicate with, and gather information from, the devices in the Carrier Ethernet network 106. Some of the information gathered include, for example, device names, types, and functions. The information exchange devices 304 may include a configuration line interface (CLI) adaptor 306, binary query language (BQL) adaptor 308, XML/SOAP adaptor 310, and SNMP adaptor 312. It should be noted that these adaptors are just examples of information exchange devices 304. Any type of device which allows devices to exchange information may be utilized.

Also included in the information exchange devices 304 is a traps listener 314. The traps listener 314 receives trap messages including fault event messages from the devices in the Carrier Ethernet network 106. Fault events are events that occur in the Carrier Ethernet network 106 which may impact one or more customers. For example, fault events may include spanning tree protocol (STP) events, link up/link down events, and pseudowire events. The trap messages may be received through a flexible network management tool (FNMT) 316 and active network abstraction (ANA) 318. In alternative embodiments, the messages may be received through other means or directly from the devices in the Carrier Ethernet network 106. The trap listener 314 forwards a fault event indication (e.g., the fault event message or other indicator) to the Carrier Ethernet mediation system 302 for correlation processing.

The FNMT 316 is a recipient of network syslog and trap messages. The FNMT 316 may accept, store, and forward messages to the ANA 318 for correlation. Furthermore, the FNMT 316 may filter or suppress trivial network events so that upper layers will not receive messages relating to the trivial network events. In one embodiment, a plurality of FNMTs 316 may collect and send trap messages to a centralized FNMT server which stores the network events in a corresponding database and forwards the network events to the ANA 318 for correlation.

The ANA 318 is a device management system which also functions as an enabling platform for value-added network and service management applications in a multi-technology, multi-service environment. The ANA 318 provides standards-based access to near real-time device and network information from the Carrier Ethernet network 106. The ANA 318 receives the network event messages from the FNMT 316 as well as device inventory and other virtual network element (VNE) supported information. In one embodiment, the ANA 318 will, periodically or based on database triggers, reconcile data in databases within the Carrier Ethernet mediation layer framework 300.

The Carrier Ethernet mediation system 302 performs discovery and fault correlation. In example embodiments, the Carrier Ethernet mediation system 302 includes a discovery engine 320 and a fault correlation engine 322. The discovery engine 320 collects and parses information, queries databases and devices for more specific network element data (e.g., attributes), and stores network element data in one or more databases (e.g., database 330). As a result, the example discovery engine 320 determines network elements in the Carrier Ethernet network 106 and their relationships to provide a baseline of an existing state of the Carrier Ethernet network 106. The discovery engine 320 will be discussed in more detail in connection with FIG. 4.

The fault correlation engine 322 correlates faults with discovered elements. The fault correlation engine 322 receives fault event messages from the trap listener 314. Network element data stored in the database 330 by the discovery engine 320 are queried and used by the fault correlation engine 322 to identify a root cause for the fault event. In some embodiments, the fault correlation engine 322 may access mapped carrier service views of the discovered network elements (as will be discussed further below) to determine actual devices affected as well as associated links and number of customers affected.

The fault correlation engine 322 generates an alert which is passed to a remedy system 328. The remedy system 328 comprises the database 330 (on a storage device) as well as a ticketing module 332. The ticketing module 332 creates an incident ticket which identifies the fault and level of the fault. The incident ticket may then be used by operators to try to remedy the fault. The fault correlation engine 322 working in conjunction with the discovery engine 320 is able to correlate faults from different parts of the network thereby greatly reducing the amount of incident tickets that need to be opened. It should be noted that the database 330 may be located elsewhere in the Carrier Ethernet mediation layer framework 300 (e.g., at Carrier Ethernet Mediation System 302).

The Carrier Ethernet mediation layer framework 300 may also include a capacity module 334 and an availability module 336. The Carrier Ethernet network 106 can be measured in a meaningful manner to determine availability/performance of the Carrier Ethernet services using the availability module 336 and capacity of the Carrier Ethernet network 106 or determine how many more subscribers may be added to the Carrier Ethernet network 106 without degrading service for existing subscribers using the capacity module 334.

The capacity module 334 and the availability module 336 poll the Carrier Ethernet network 106 at scheduled intervals for capacity and availability/performance metrics, respectively. The capacity module 334 and the availability module 336 then use discovered data (e.g., discovered network element data and carrier service views stored in the database 330) in calculating capacity and availability/performance metrics for the Carrier Ethernet network 106. For example, the discovery engine 220 may determine that 500 users are connected to a particular device or sets of devices in the Carrier Ethernet network 106. Based on the discovered network elements and the carrier service view a determination that 1000 users may be handled by the particular device or sets of devices is made. Thus, the capacity module 334 may conclude that 500 more users may be added, and an appropriate message may be provided to a system operator. The same process may be used to determine service availability. The capacity module 334 and availability module 336 may be embodied within a system (e.g., InfoVista 338) which collects performance metrics from devices via polling mechanisms.

The Carrier Ethernet Mediation Layer Framework 300 may further comprise one or more storage devices 340. The storage devices 340 store various data in associated databases. For example, the databases 330 of the remedy system 328 may, instead, be located on the storage devices 340. It should be noted that while the storage devices 340 are shown coupled to various systems in the Carrier Ethernet Mediation Layer Framework 300, the storage devices 340 may be located anywhere in the Carrier Ethernet Mediation Layer Framework 300.

Figure 4:
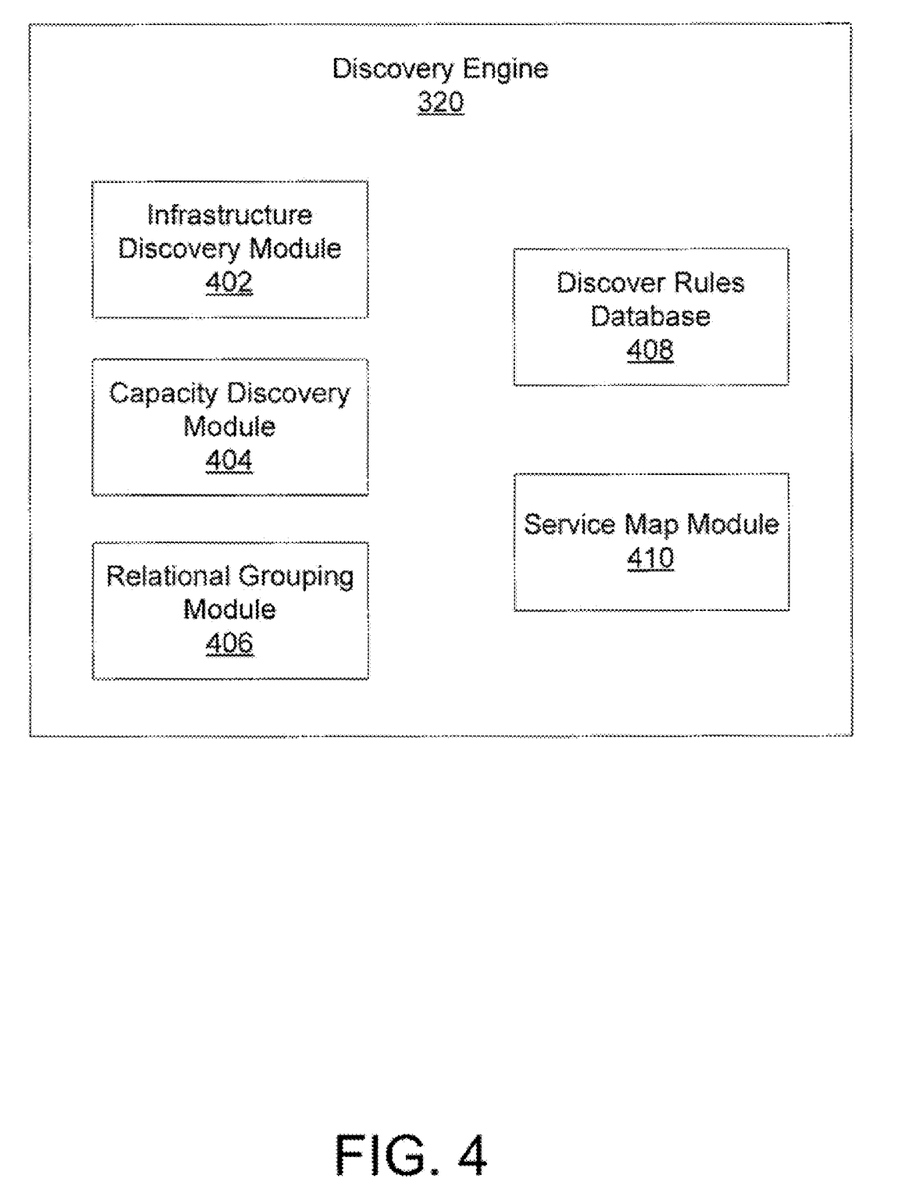
FIG. 4 depicts a block diagram of an example discovery engine.

Referring to FIG. 4, the discovery engine 320 is shown in more detail. The discovery engine 320 includes an infrastructure discovery module 402, a capacity discovery module 404, a relational grouping module 406, a discovery rules database 408, and a service map module 410.

The infrastructure discovery module 402 discovers infrastructure components in the Carrier Ethernet network 106. The infrastructure components include, for example, devices (e.g., user provider edge (UPE) devices, network provider edge (NPE) devices, provider edge (PE) devices, provider core (P) devices, etc.), network connections (e.g., port and interface identities such as network-network interface ID (NNI-ID), service provisioning (e.g., configurations and programming that governs port behavior), topologies (e.g., rings, hubs and spokes, mesh), relationships (e.g., network connectivity between components), and peripheral components (e.g., DNS, DHCP, BRAS, and video servers).

The capacity discovery module 404 discovers capabilities (e.g., port speed and features), capacity of components (e.g., bandwidth, MAC address table usage/limits, VLAN usage/limits, routing table usage/limits, etc.), performance (e.g., measured versus computed), and availability (e.g., redundancy, backup paths, etc.).

Discovery of the network elements (e.g., infrastructure, capabilities, capacity, etc.) occurs via queries of databases, both internal (e.g., the database 330) and external databases as well as queries to devices in the Carrier Ethernet network 106. Based on the queries, the discovery engine 320 may make assertions about the service associated with the devices (e.g., device A is configured for video service). The discovered network element data are then stored to the databases 330 for use by the relational grouping module 406, service map module 410, and correlation engine 322. Thus, the infrastructure discovery module 402 and the capacity discovery module 404 can uniquely identify components of the Carrier Ethernet network 106. It should be noted that the listed network elements are not an exhaustive list and may comprise other elements as needed. Additionally, the infrastructure discovery module 402 and the capacity discovery module 404 may be combined into a single module used to discover network elements.

After the infrastructure discovery module 402 and the capacity discovery module 404 have discovered the individual network elements, the relational grouping module 406 uses rules in the discovery rule database 408 to create relational groupings. These relational groupings are meaningful groupings of the discovered network elements based, for example, on relationships between the network elements. These relationships may also be developed by the relational grouping module 406 based on the discovered network elements.

In one example, the relational grouping is a metro Ethernet ring (MER-ID). In this example, the relational grouping module 406 relates discovered network elements (e.g., devices) within a ring to derive required information such as direction of transmission during normal situation, direction of transmission during failure, redundancy, capacity, and performance related entities.

Another example of an relational grouping is a service instance tag. In this relational grouping, the relational grouping module 406 captures services (e.g., high speed Internet service or video service based on their performance characteristics) provisioned on customer ports and their relation on core facing ports and metro Ethernet rings. Other examples may include user provider edge identifiers (e.g., identifying network elements at the edge of the service provider network) and Ethernet virtual circuit identifiers (e.g., identifying network elements involved in a point-to-point connection between a pair of sites within the service provider network which can be shared between one or more customers and is offered with a wider choice of committed bandwidth levels—up to wire speed).

The service map module 410 generates Carrier Ethernet service maps or views. The Carrier Ethernet service views provide logical views of the Carrier Ethernet network 106 based on a type of service. The network elements and relational groupings are mapped to different applications and services that are running on the Carrier Ethernet network 106. That is, user level services (e.g., home networks, video, channels) are associated with the relational groupings to generate a service view of the Carrier Ethernet network 106. As a result, if video (i.e., the service) at a residence is bad (e.g., pixilation), for example, the correlation engine 322 can identify the device(s) that are causing the problem.

For example, for a residential high speed Internet service, a logical service path may be created by the service map module 410. Along this path, alternative and backup paths are also determined and recorded. Creation of the Carrier Ethernet service views enable a meaningful manner for managing the Carrier Ethernet network 106 to determine what services are affected by fault events, how many more subscribers can be provisioned on the Carrier Ethernet network 106 without degrading user experiences for existing customers, and countless other service related determinations.

Figure 5:
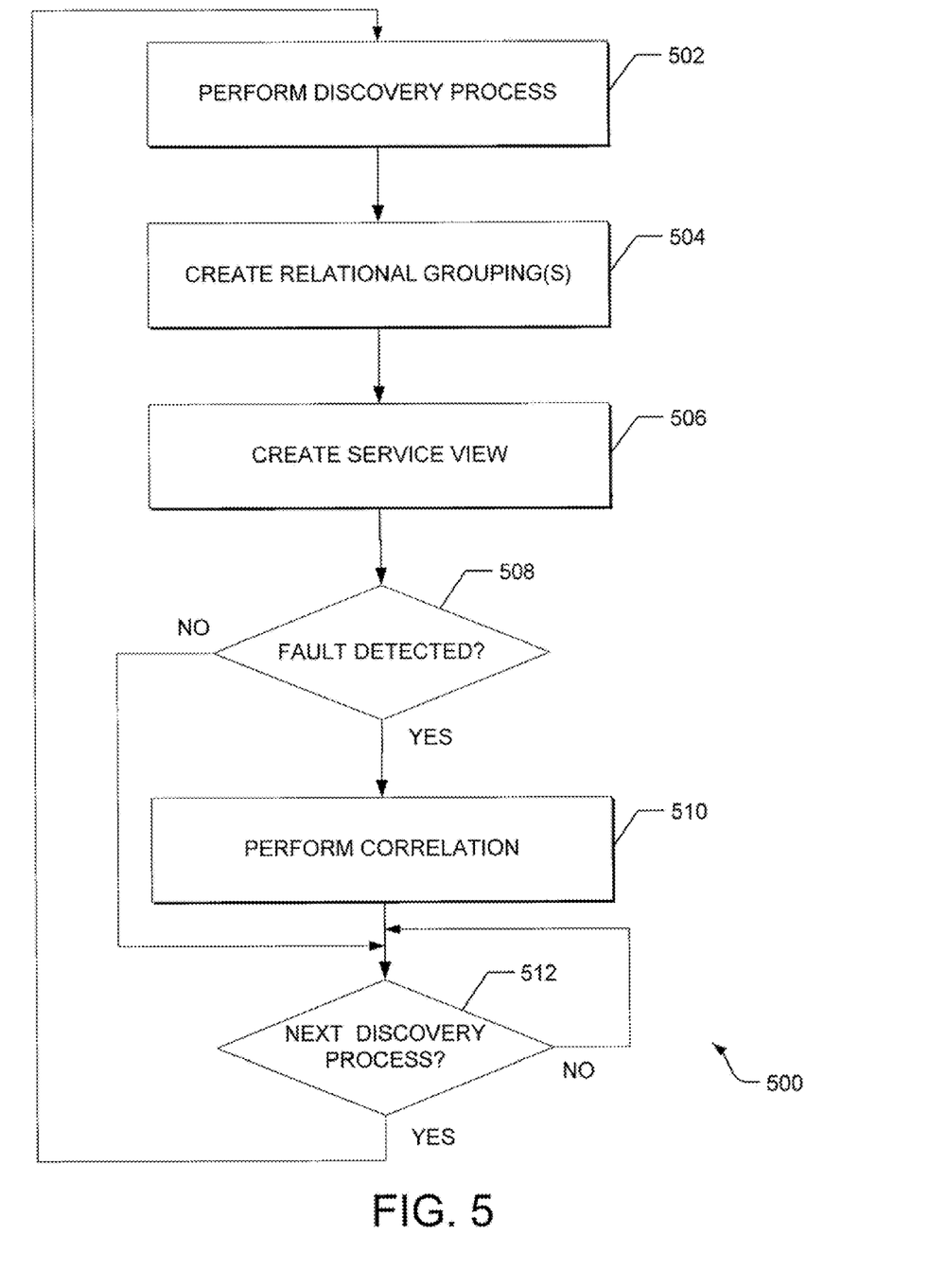
FIG. 5 depicts a flow diagram of a detailed method, in accordance with an embodiment, for Carrier Ethernet service discovery and correlation.

FIG. 5 depicts a flow diagram of a detailed method 500, in accordance with an embodiment, for Carrier Ethernet service discovery and correlation. At 502, the discovery process is performed. By performing the discovery process, network elements (e.g., devices, provisions, relationships, protocols, topology, and capabilities) may be identified. The discovery process will be discussed in more detail in connection with FIG. 6.

Based on the network elements discovered by the discovery process at 502, relational groupings may be created at 504. In an example embodiment, the relational groupings are created by the relational grouping module 406 of the discovery engine 320 and comprise meaningful groupings of discovered elements based on rules stored in the discover rules database 408. The network elements are grouped based on relationships between the network elements. These relationships may be determined based on rules stored in the discovery rules database 408 or be generated by the relational grouping module 406 based on information known regarding the network elements.

At 506, a Carrier Ethernet service view is created. The Carrier Ethernet service view provides a logical view of the Carrier Ethernet network 106 based on service types. The network elements and relational groupings are mapped to different applications and services that are running on the Carrier Ethernet network 106. In example embodiments, the Carrier Ethernet service view is created by the service map module 410.

If a fault event is detected at 508, then correlation processing is performed at 510. A fault event may be detected by the traps listener 314 which receives a fault (trap) message from one or more devices affected by the fault event. The correlation process will be discussed in more detail in connection with FIG. 7.

At 512, a determination is made as to whether a next discovery process should occur. In one embodiment, the next discovery process may be based on a schedule (e.g., discovery process scheduled to occur every 15 minutes). In an alternative embodiment, the next discovery process may be triggered by an event. For example, a receipt of a fault message may trigger the next discovery process.

Figure 6:
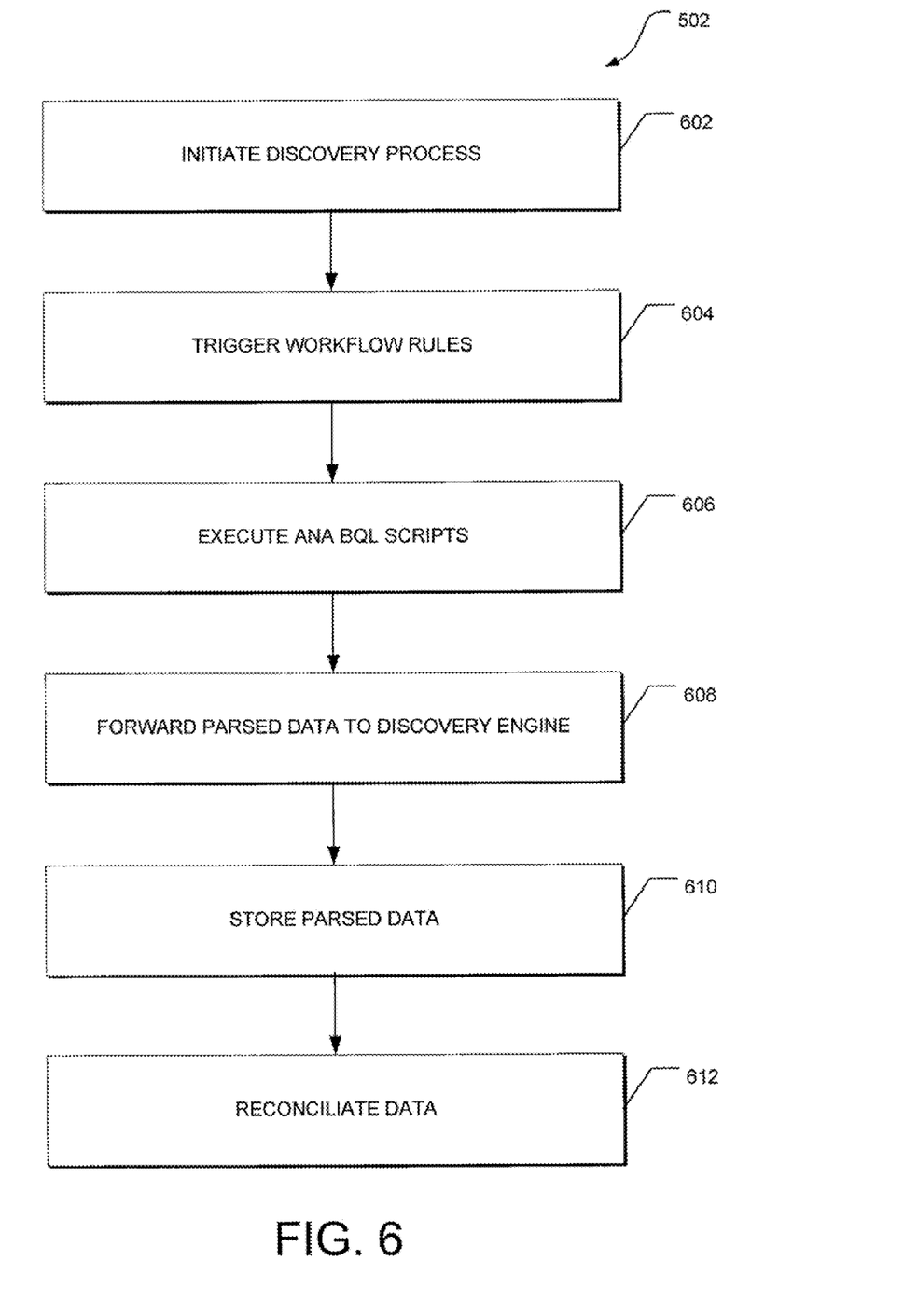
FIG. 6 depicts a flow diagram of a detailed method, in accordance with an embodiment, for performing discovery.

In accordance with an embodiment, FIG. 6 depicts a flow diagram of a detailed method for performing discovery (502). At 602, the discovery process is initiated. As discussed, the discovery process may be triggered by schedule or by an event.

Workflow rules are triggered at 604. The workflow rules are rules in the discovery rules database 408 which help to identify the devices, capabilities, relationships, and other elements in the Carrier Ethernet network 106. The workflow rules also trigger ANA BQL scripts to be executed at 606 to obtain the network element data. Thus, execution of the scripts allows the discovery of the network elements of the Carrier Ethernet network 106. In one embodiment, the BQL script is a bean shell script executed in JAVA. It should be noted that the script may be any format.

The (parsed) data is obtained by the ANA 318 and then forwarded to the discovery engine 320 at 608. The discovery engine 302 then stores the data to the database 330 at 610. The discovery engine 320 also reconciles the newly discovered network data with previously discovered network elements in the database 330 at 612.

Figure 7:
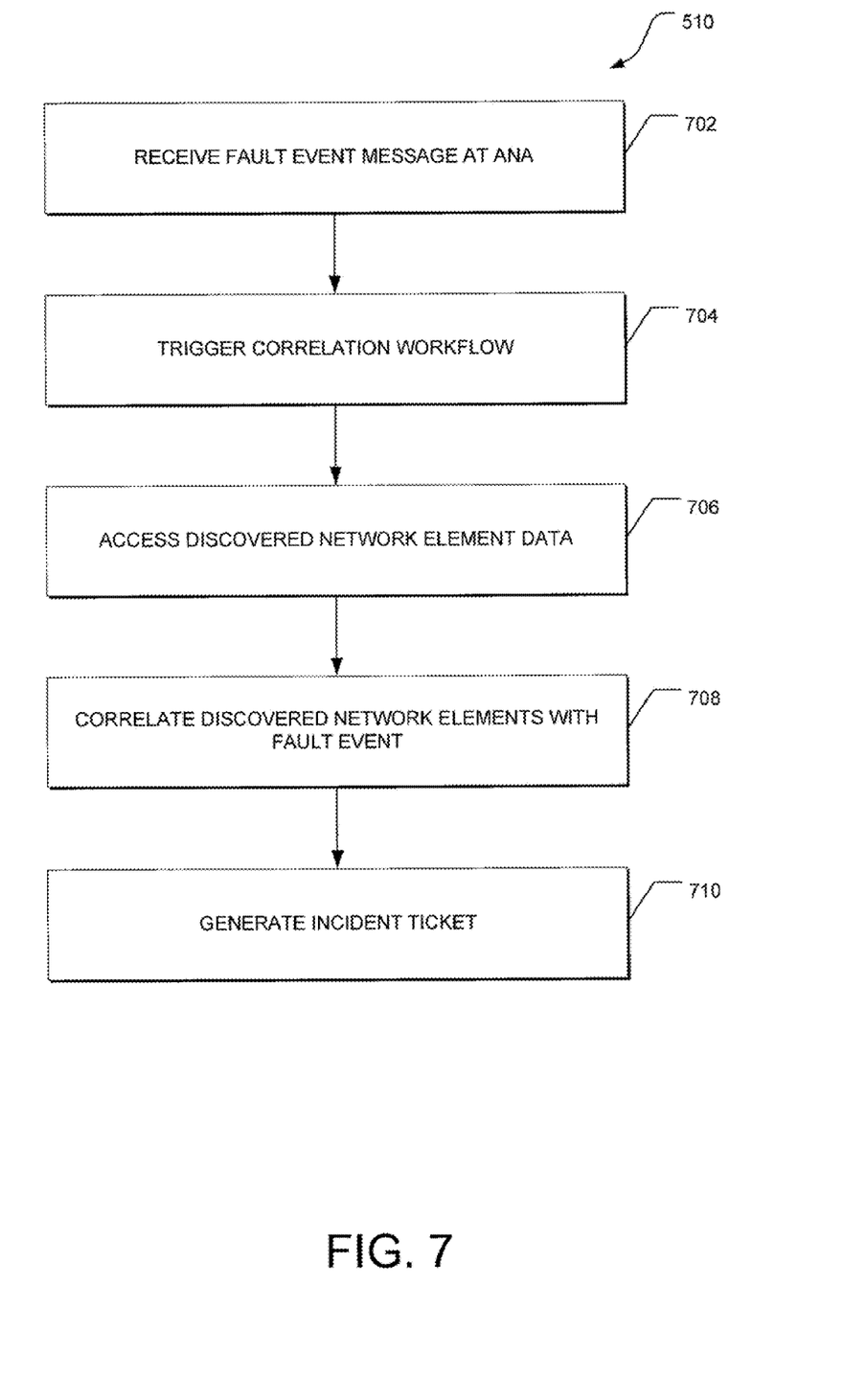
FIG. 7 depicts a flow diagram of a detailed method, in accordance with an embodiment, for performing correlation.

FIG. 7 depicts a flow diagram of a detailed method for performing correlation (510). At 702, a fault event message is received. In one embodiment, a fault event in the Carrier Ethernet network 106 may trigger a fault event message to the FNMT 316. The FNMT 316 then forwards the fault event message to the ANA 318. The traps listener 314 then detects the fault event. For example, the fault event may be a port is down. The fault event message or indicator is then forwarded to the fault correction engine 322.

Once the fault correction engine 322 receives the fault event message, a correlation workflow is triggered at 704. Correlation workflow comprises accessing the discovered network element data stored at the database 330 at 706, and correlating the discovered network elements with the fault event at 708. Continuing with the example, the correlation engine 322 will access the database 330 and determine the device(s), port(s), and service(s) associated with the port down fault event message. The root cause is then determined. For example, a particular faulty port in the Carrier Ethernet network 106 caused a STP control plane issue.

Based on the correlation at 708, an incident ticket is generated at 710. The incident ticket is generated by the ticketing module 332 and provides information including identification of the affected network elements (e.g., devices, networks, paths) and the fault event. The incident ticket may also present recommendations for remedying the problem.

While the flow diagram of FIG. 7 describes correlation of fault events, it is noted that correlation of availability, capacity, and performance may be performed in a similar manner.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 8:
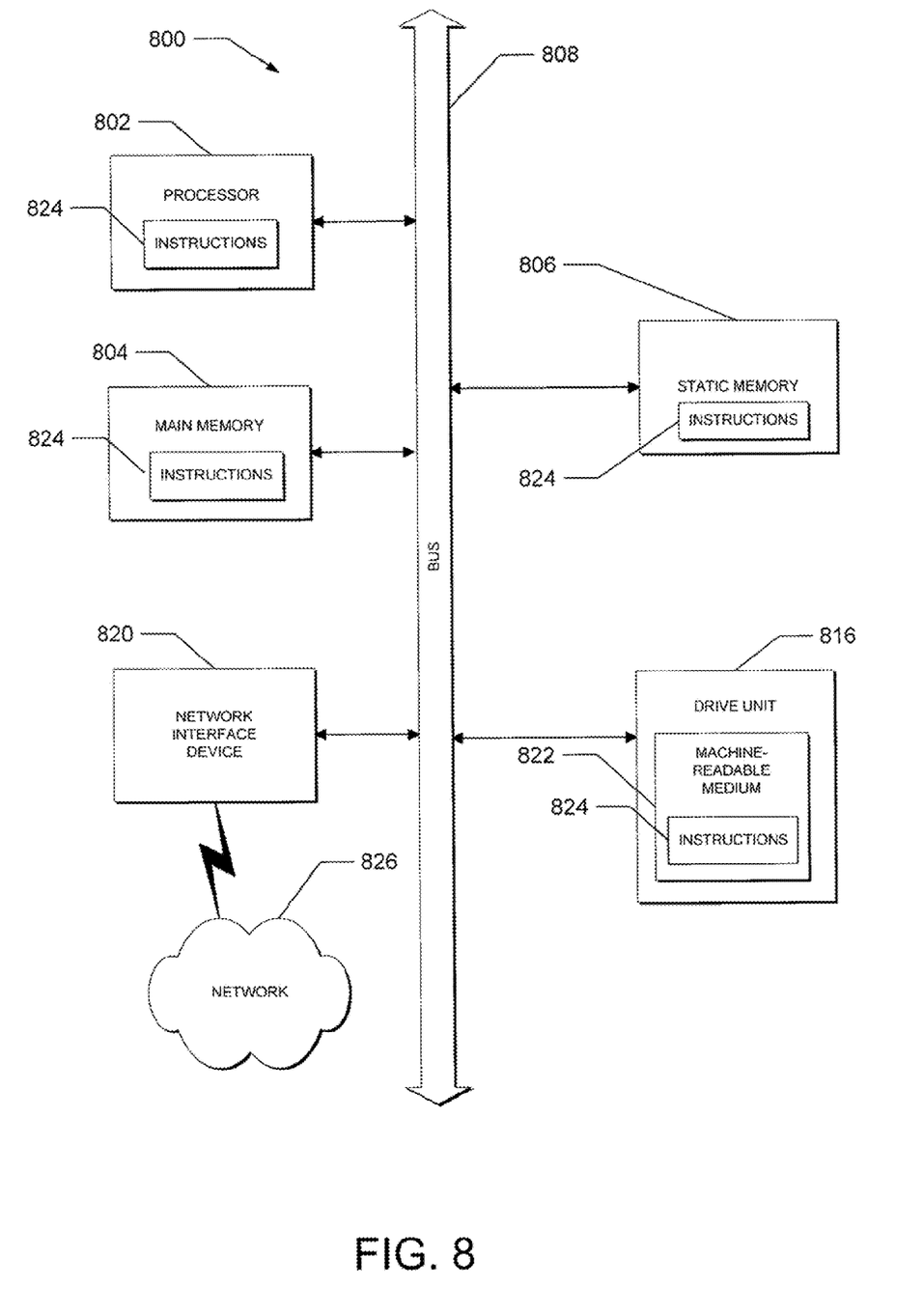
FIG. 8 is a simplified block diagram of a machine in the example form of an apparatus within which a set of instructions, for causing the machine to perform any one or more of the methodologies discussed herein, may be executed.

FIG. 8 is a simplified block diagram of a machine in the example form of an apparatus 800 within which a set of instructions, for causing the machine to perform any one or more of the methodologies discussed herein, may be executed. In alternative embodiments, the machine may be connected (e.g., networked) to other machines. The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example apparatus 800 includes a processor 802 (e.g., a central processing unit (CPU)), a main memory 804, and a static memory 806, which communicate with each other via bus 808. The apparatus 800 may also include a disk drive unit 810 and a network interface device 812.

The disk drive unit 810 includes machine-readable medium 814 on which is stored one or more sets of instructions and data structures 816 (e.g., software) embodying or utilized by any one or more of the methodologies or functions described herein. The instructions may also reside, completely or at least partially, within the main memory 804 and/or within the processor 802 during execution thereof by the apparatus 800, with the main memory 804 and the processor 802 also constituting machine-readable, tangible media. The instructions 816 may further be transmitted or received over network 818 via network interface device 810 utilizing any one of a number of well-known transfer protocols.

While machine-readable medium 814 is shown in an embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories and optical and magnetic media.

While the invention(s) is (are) described with reference to various implementations and exploitations, it will be understood that these embodiments are illustrative and that the scope of the invention(s) is not limited to them. In general, techniques for discovery and correlation may be implemented with facilities consistent with any hardware system or hardware systems defined herein. Many variations, modifications, additions, and improvements are possible.

As used herein, the term "or" may be construed in either an inclusive or exclusive sense. Additionally, although various example embodiments discussed below focus on Carrier Ethernet services, the embodiments are given merely for clarity and disclosure. Alternative embodiments may employ other systems, methods, and carrier types and are considered as being within the scope of the present disclosure.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
    initiating a discovery process that uses workflow rules stored in a discovery rule database, the workflow rules causing a script to be executed to discover network elements on a carrier network;
    discovering the network elements on the carrier network by querying devices in the carrier network;
    storing data associated with the discovered network elements resulting from the querying of the devices into one or more databases; and
    creating, using a processor of a machine, at least one relational grouping of the discovered network elements based on the data associated with the discovered network elements and rules stored in the discovery rule database.

2. The method of claim 1, wherein the relational grouping created based on the data associated with the discovered network elements and rules stored in the discovery rule database is a metro Ethernet ring.

3. The method of claim 1, wherein the relational grouping created based on the data associated with the discovered network elements and rules stored in the discovery rule database is a service instance tag.

4. The method of claim 1, wherein the relational grouping created based on the data associated with the discovered network elements and rules stored in the discovery rule database is a provider edge identifier.

5. The method of claim 1, wherein the relational grouping created based on the data associated with the discovered network elements and rules stored in the discovery rule database is an Ethernet virtual circuit identifier.

6. The method of claim 1, wherein the discovered network elements comprise at least one selection from the group consisting of a network device, network connection, network-network interface identifier, service provisioning, topologies, protocols, capabilities, relationships, peripheral components, performance, availability or capacity of devices, ports, and rings.

7. The method of claim 1, further comprising creating a carrier service view based on the discovered network elements, the carrier service view providing a logical view of the carrier network whereby the network elements and relational groupings are mapped to different applications and services running on the carrier network.

8. The method of claim 7, further comprising calculating a capacity metric based in part on the carrier service view.

9. The method of claim 7, further comprising calculating an availability metric for availability of a service on the carrier network based in part on the carrier service view.

10. The method of claim 1, further comprising correlating a fault event with at least one network element of the discovered network elements on the carrier network.

11. The method of claim 10, further comprising generating an incident ticket based on the correlated fault event and the at least one network element.

12. An apparatus comprising:
    at least one processor of a machine,
    at least one discovery module to initiate a discovery process that uses workflow rules stored in a discovery rule database, the workflow rules causing a script to be executed to discover network elements on a carrier network and to discover the network elements on the carrier network by querying devices in the carrier network;
    at least one database to store data associated with the discovered network elements resulting from the querying of the devices; and
    a relational grouping module to create, using the at least one processor of the machine, at least one relational grouping of the discovered network elements based on the data associated with the discovered network elements and rules stored in the discovery rule database.

13. The apparatus of claim 12, wherein the discovered network elements comprise at least one selection from the group consisting of a network device, network connection, network-network interface identifier, service provisioning, topologies, protocols, capabilities, relationships, peripheral components, performance, availability or capacity of devices, ports, and rings.

14. The apparatus of claim 12, further comprising a service map module to create a carrier service view based on the discovered network elements, the carrier service view providing a logical view of the carrier network based on type of service.

15. The apparatus of claim 14, further comprising a capacity module to determine a capacity metric based in part on the carrier service view.

16. The apparatus of claim 14, further comprising an availability module to determine an availability metric based in part on the carrier service view.

17. The apparatus of claim 12, further comprising a correlation engine to correlate a fault event with at least one network element.

18. The apparatus of claim 15, further comprising a ticketing module to generate an incident ticket based on the correlated fault event and the at least one network element.

19. A non-transitory machine-readable storage medium in communication with the at least one processor, the machine-readable storage medium storing instructions, the instructions being executed by the at least one processor of a machine to cause the machine to perform operations comprising:
    initiating a discovery process that uses workflow rules stored in a discovery rule database, the workflow rules causing a script to be executed to discover network elements on a carrier network;
    discovering the network elements on the carrier network by querying devices in the carrier network;
    storing data associated with the discovered network elements resulting from the querying of the devices into one or more databases; and
    creating, using a processor of a machine, at least one relational grouping of the discovered network elements based on the data associated with the discovered network elements and rules stored in the discovery rule database.

20. The non-transitory machine-readable storage medium of claim 19 wherein the discovered network elements comprise at least one selection from the group consisting of a network device, network connection, network-network interface identifier, service provisioning, topologies, protocols, capabilities, relationships, peripheral components, performance, availability or capacity of devices, ports, and rings.

* * * * *